United States Patent
Nakamura

(10) Patent No.: US 6,843,462 B2
(45) Date of Patent: Jan. 18, 2005

(54) MANUFACTURING APPARATUS OF FIBER REINFORCED COMPOSITE MEMBER

(75) Inventor: Takeshi Nakamura, Tokorozawa (JP)

(73) Assignee: Ishikawajima-Harima Heavy Industries, Co., Ltd., Tokyo (JP)

( * ) Notice: Subject to any disclaimer, the term of this patent is extended or adjusted under 35 U.S.C. 154(b) by 230 days.

(21) Appl. No.: 10/166,752

(22) Filed: Jun. 12, 2002

(65) Prior Publication Data

US 2002/0160068 A1 Oct. 31, 2002

Related U.S. Application Data

(62) Division of application No. 09/761,772, filed on Jan. 18, 2001, now Pat. No. 6,692,673.

(30) Foreign Application Priority Data

Jan. 24, 2000 (JP) .......................................... 2000-13754

(51) Int. Cl.⁷ .............................................. B29C 33/76
(52) U.S. Cl. ...................................... 249/184; 249/186
(58) Field of Search .................. 249/176, 177, 249/184, 186

(56) References Cited

U.S. PATENT DOCUMENTS

| | | | |
|---|---|---|---|
| 430,520 A | * 6/1890 | France | ........................ 249/186 |
| 2,028,040 A | 1/1936 | Benge | |
| 3,290,421 A | * 12/1966 | Miller, Jr. | .................... 249/176 |
| 4,213,932 A | * 7/1980 | Young | ......................... 249/184 |
| 4,263,249 A | * 4/1981 | Mayumi et al. | ............. 249/184 |
| 4,487,567 A | * 12/1984 | Possis et al. | ................. 249/186 |
| 4,772,438 A | 9/1988 | Watanabe et al. | |
| 4,969,811 A | * 11/1990 | Littleton | ..................... 249/177 |
| 5,135,596 A | 8/1992 | Pabsch et al. | |
| 5,624,618 A | 4/1997 | Forman et al. | |
| 6,113,826 A | 9/2000 | Tajima et al. | |

FOREIGN PATENT DOCUMENTS

| | | |
|---|---|---|
| EP | 0399 548 A2 | 11/1990 |
| EP | 0417 676 A2 | 3/1991 |
| EP | 0417 676 A3 | 3/1991 |
| EP | 1 024 121 A3 | 8/2000 |
| EP | 1 024 121 A2 | 8/2000 |
| JP | 2000-219576 A | 8/2000 |

* cited by examiner

*Primary Examiner*—Robert B. Davis
(74) *Attorney, Agent, or Firm*—Griffin & Szipl, P.C.

(57) ABSTRACT

There is disclosed a method of connecting a plurality of mandrels to one another to constitute an integral mandrel 10, forming a fabric 1 on the surface of the integral mandrel, and infiltrating the formed fabric with matrix. A plurality of products can simultaneously be manufactured, and this can remarkably reduce fiber loss and enhance productivity.

2 Claims, 4 Drawing Sheets

MANUFACTURING APPARATUS OF FIBER REINFORCED COMPOSITE MEMBER

This is a division of U.S. patent application Ser. No. 09/761,772 filed on Jan. 18, 2001 now U.S. Pat. No. 6,692,673. The entire disclosure of the above application is hereby incorporated by reference.

BACKGROUND OF THE INVENTION

1. Field of the Invention

The present invention relates to a manufacturing method and apparatus of a fiber reinforced composite member, in which a plurality of products can simultaneously be manufactured.

2. Description of the Related Art

In order to raise the performance of a rocket engine using $NTO/N_2H_4$, NTO/MMH, and the like as impelling agents, heat-resistant temperature of a combustor (thrust chamber) is requested to be raised. For this purpose, a coated niobium alloy having a heat-resistant temperature of about 1500° C. has heretofore been used as a chamber material for many rocket engines. However, this material is disadvantageously heavy because of its high density, low in high-temperature strength, and has a short coating life.

On the other hand, since ceramic is high in heat resisting properties but disadvantageously brittle, a ceramic matrix composite member (hereinafter abbreviated as CMC) has been developed by reinforcing the ceramic with ceramic fiber. Specifically, a ceramic matrix composite member (CMC) comprises ceramic fiber and ceramic matrix. Additionally, in general the CMC is indicated as ceramic fiber/ceramic matrix by its material (e.g., when both are formed of SiC, SiC/SiC is indicated). Additionally, the ceramic matrix composite member (CMC) will be described hereinafter in detail, but the present invention is not limited to this, and can similarly be applied also to carbon-based composite members such as C/C, C/SiC and SiC/C.

Since CMC is light-weight and high in high-temperature strength, it is a remarkably prospective material for the combustor (thrust chamber) of the rocket engine, further a fuel piping in a high-temperature section, a turbine vane of a jet engine, a combustor, an after-burner component, and the like.

However, the conventional CMC cannot hold its hermetic properties and is disadvantageously low in resistance to thermal shock. Specifically, for the conventional CMC, after a predetermined shape is formed of ceramic fibers, a matrix is formed in a gap between the fibers in so-called chemical vapor infiltration (CVI) treatment. However, a problem is that it takes an impractically long time (e.g., one year or more) to completely fill the gap between the fibers by the CVI. Moreover, in a high-temperature test or the like of the conventional CMC formed as described above, when a severe thermal shock (e.g., temperature difference of 900° C. or more) acts, the strength is drastically lowered, and the CMC can hardly be reused.

Therefore, the conventional ceramic matrix composite member (CMC) cannot substantially be used in the combustor (thrust chamber), the fuel piping or another component requiring the hermetic properties and resistance to thermal shock.

In order to solve the aforementioned problem, the present inventor et al. have created and filed a patent application, "Ceramic-based Composite Member and its Manufacturing Method" (Japanese Patent Application No. 19416/1999, not laid yet). The Ceramic-based Composite Member can largely enhance the hermetic properties and thermal shock resistance and it can be for practical use in the thrust chamber, and the like. In the invention, as schematically shown in FIG. 1, after subjecting the surface of a shaped fabric to CVI treatment to form an SiC matrix layer, PIP treatment is performed to infiltrate and calcine a gap of the matrix layer with an organic silicon polymer as a base.

In a manufacture process shown in FIG. 1, from a braiding process (1) to a CVI process (3), a jig or mandrel, for example, of carbon or the like is used to form a fabric 1 in a periphery and subsequently, the CVI treatment is performed. Since matrix is formed in the gap of the fabric 1 by the CVI treatment and a shape is held, in this stage, the mandrel is detached, and subsequent PIP treatment (4) and machining (5) are performed in a conventional art. Additionally, in the braiding process, as schematically shown in FIG. 2, for example, braid weave is used in which a braided thread is alternately and obliquely woven into a middle thread.

In the manufacture process, however, products (hereinafter referred to as CMC product) of the ceramic matrix composite member have heretofore been manufactured individually one by one. In this case, particularly, in the braiding process, when fiber is wound onto the mandrel, the fiber is wound onto an engaging allowance to a textile weaving loom and a portion of the mandrel other than a product portion. Therefore, as compared with the fiber used in the product portion, there are a large proportion of finally wasted fiber, much fiber loss, and the like, and this raises cost. For example, although ceramic fiber used in the CMC product is expensive, in the conventional art, even with a relatively large CMC product (thrust chamber or the like), a fiber effective utilization ratio is only around 20%, and about 80% results in loss.

Moreover, even in the braiding process and the subsequent CVI treatment, PIP treatment and machining, the products are individually treated one by one in the conventional art. Therefore, particularly in the small-sized CMC product, there is a problem that much labor is required for setting/preparation or the like to the apparatus and that productivity is low.

SUMMARY OF THE INVENTION

The present invention has been developed to solve the problem. Specifically, an object of the present invention is to provide a manufacturing method and apparatus of a fiber reinforced composite member, which can simultaneously manufacture a plurality of products, remarkably reduce fiber loss, and enhance productivity.

According to the present invention, there is provided a manufacturing method of a fiber reinforced composite member comprising steps of: connecting a plurality of mandrels to one another to constitute an integral mandrel; forming a fabric on the surface of the integral mandrel; and infiltrating the formed fabric with matrix.

In addition according to the present invention, there is provided a manufacture apparatus of a fiber reinforced composite member for forming a fabric on the surface of a mandrel, and infiltrating the formed fabric with matrix, and the manufacture apparatus comprises a connection segment for connecting a plurality of mandrels to one another.

According to the method and apparatus of the present invention, since the integral mandrel obtained by connecting the plurality of mandrels to one another is used to manufacture a ceramic matrix composite member, a plurality of products can simultaneously be manufactured on the surface of the plurality of mandrels.

Moreover, for fiber loss generated in a braiding process for winding onto an engaging allowance to a loom and a portion of the mandrel other than a product portion, even when the integral mandrel is used, an absolute amount is substantially the same as that when unit products are individually manufactured one by one. Therefore, by performing simultaneous braiding for a plurality of products, the fiber loss per unit product can be reduced to a few fractions.

Furthermore, even in the braiding process and subsequent CVI treatment, PIP treatment and machining, simultaneous machining is possible for a plurality of products, labor of setting/preparation or the like to the apparatus is reduced to a few fractions per unit product as compared with a case in which the products are individually treated one by one, and the productivity can be enhanced so much more.

Additionally, according to a preferred embodiment of the present invention, after infiltration of the matrix, a fiber reinforced composite member is cut at a connected portion at which a plurality of mandrels are connected to one another.

By this method, the member can be divided into respective unit products, and subsequently necessary processes are further performed so that the products can be completed.

Moreover, a maximum diameter of a connection segment is formed to be smaller than a diameter of the connected portion to the mandrel.

In this constitution, since a stepped portion is hardly formed in the connected portion of a mandrel segment, the fiber can smoothly be wound around the entire surface of an integral mandrel in the braiding process, and the fabric can be formed on the surface of each mandrel segment.

Moreover, after the CVI treatment and PIP treatment, if treatment of each product is necessary, by separating the connected portion of the mandrel segment, separation into the respective products can easily be performed.

Furthermore, the mandrel is constituted to be dividable at a middle portion which is smaller than both end portions.

By this constitution, by dividing the mandrel segment at the middle portion which is smaller than each end portion, the mandrel can be separated/removed without damaging the product.

Other objects and advantageous characteristics of the present invention will be apparent from the following description with reference to accompanying drawings.

DETAILED DESCRIPTION OF THE PREFERRED EMBODIMENTS

A preferred embodiment will be described hereinafter with reference to the drawings.

Figure 1:
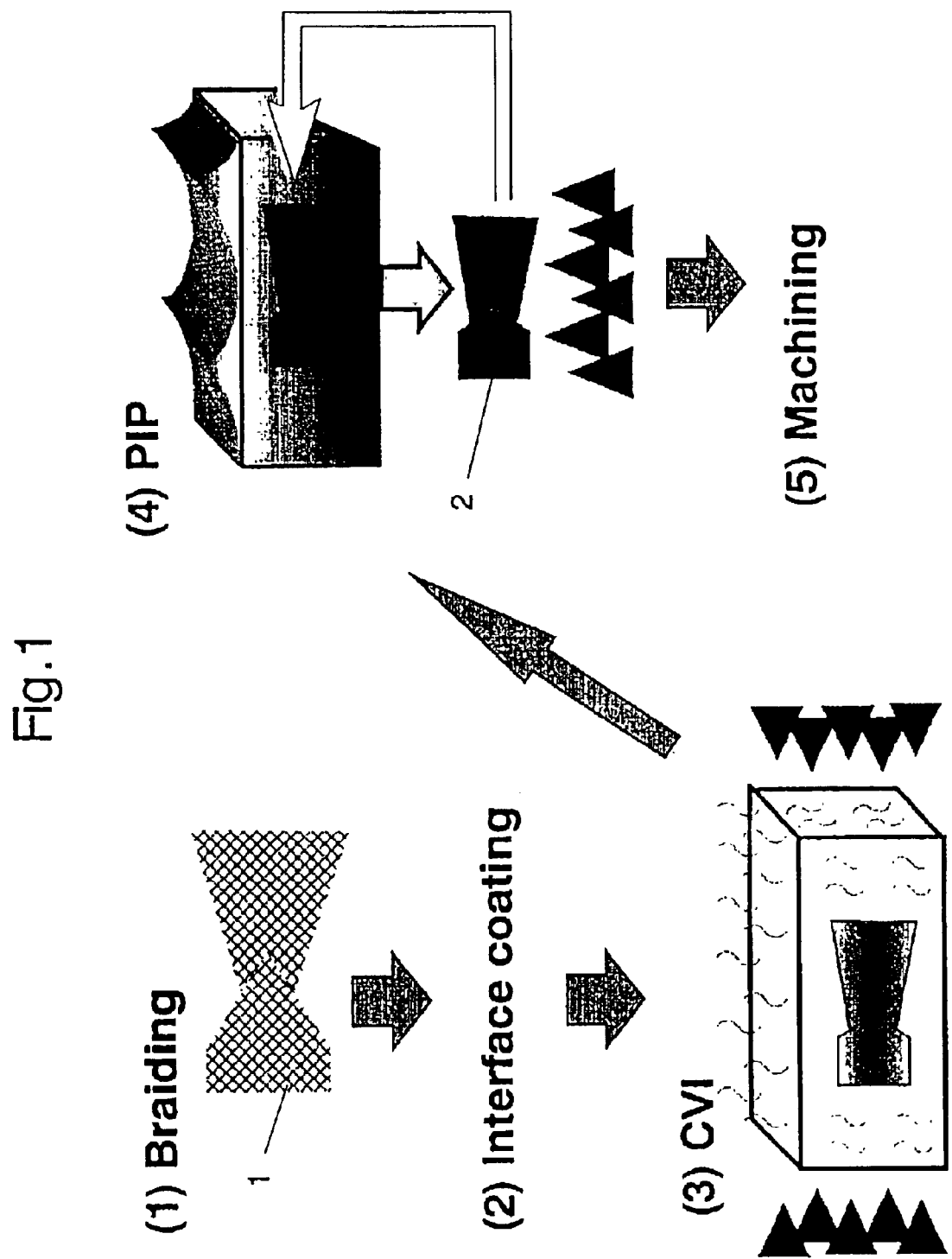
FIG. 1 is a schematic view of a CMC manufacturing method to which the present invention is applied.
Figure 2:
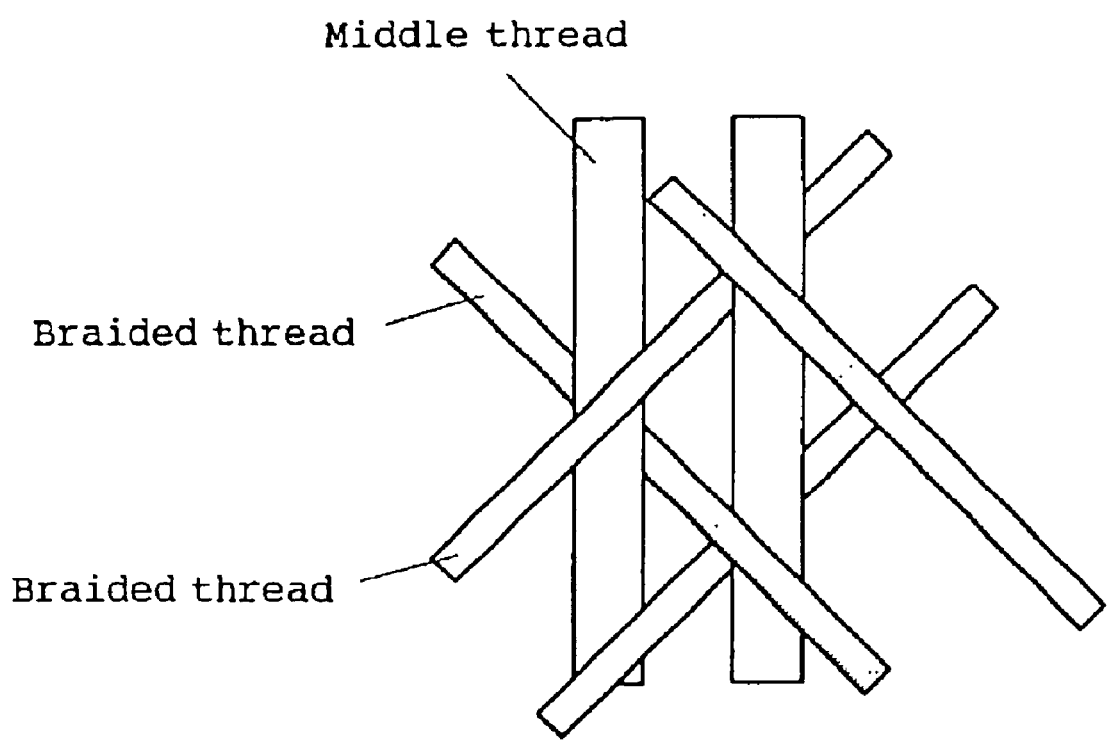
FIG. 2 is a schematic view of a braid weave.
Figure 3:
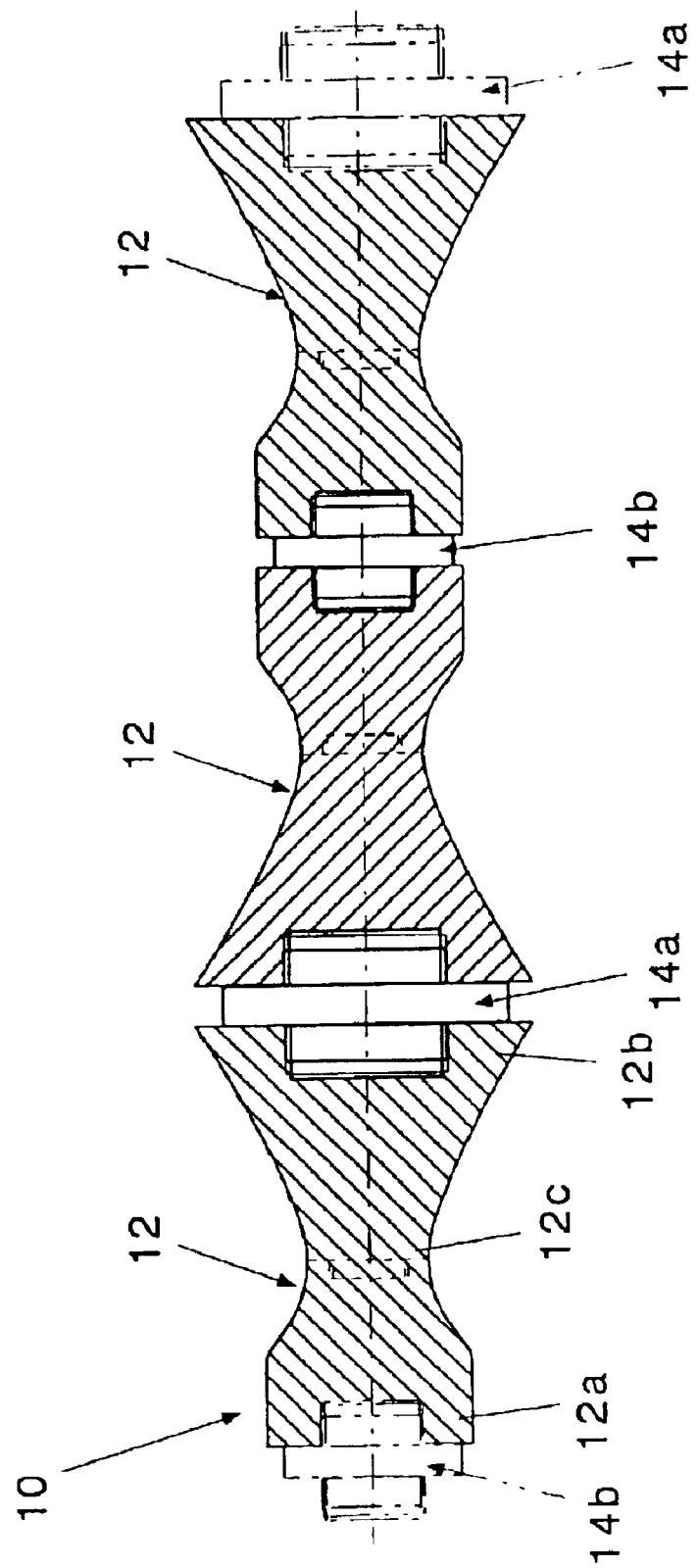
FIG. 3 is a schematic view of a mandrel applied to a manufacture apparatus of the present invention.

FIG. 3 is a schematic view of a mandrel applied to a manufacture apparatus of the present invention. As shown in FIG. 3, a mandrel 10 is an integral mandrel constituted by connecting both end portions 12a, 12b of a mandrel segment 12 for a unit product to one another, and linearly connecting a plurality of (three in FIG. 3) mandrel segments to one another.

Moreover, connection segments 14a, 14b are connected to both end portions 12a, 12b of the mandrel segment 12 via screws or the like, and the same end portions of the mandrel segment 12 (e.g., 12a and 12a, or 12b and 12b) are detachably connected to each other. Additionally, the connection segments 14a, 14b may be used to form the mandrel 10 as the integral mandrel of four or more mandrel segments 12.

Furthermore, the mandrel segment 12 is constituted to be dividable at a middle portion 12c which is smaller than both end portions 12a, 12b. Additionally, when this middle portion is particularly small, by disposing a groove in a circumferential shape, the mandrel may be constituted to be ruptured and divided along the groove.

Moreover, as shown in FIG. 3, a maximum diameter of the connection segment 14a, 14b is formed to be smaller than a diameter of a connected portion of the mandrel segment. Therefore, a groove 15 with a diameter smaller than that of a product is constituted between adjacent mandrel segments 12.

Figure 4A:
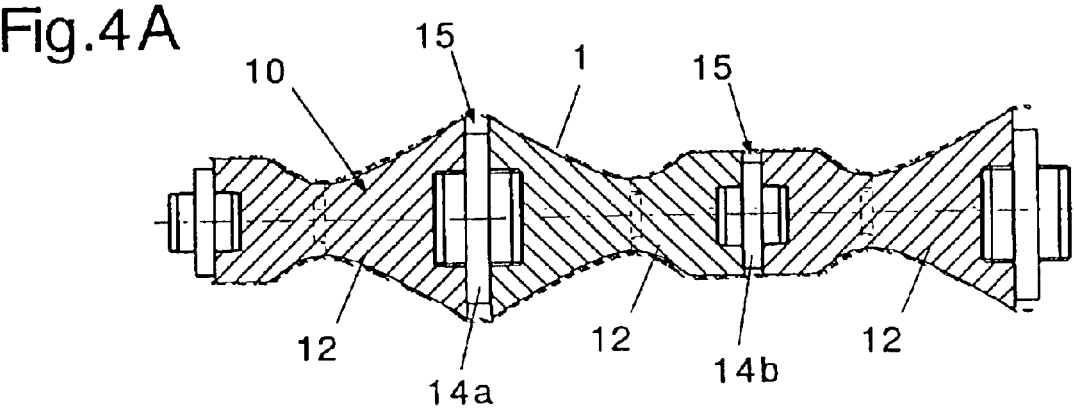
FIGS. 4A to 4D are schematic views of the manufacturing method in which the mandrel of FIG. 3 is used.
Figure 4B:
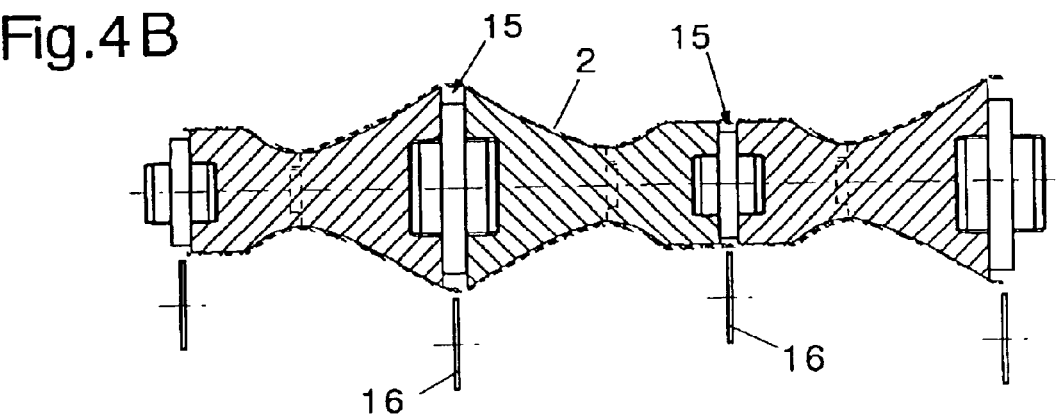
Figure 4C:
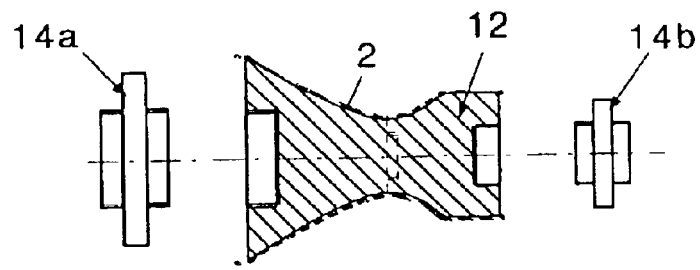
Figure 4D:
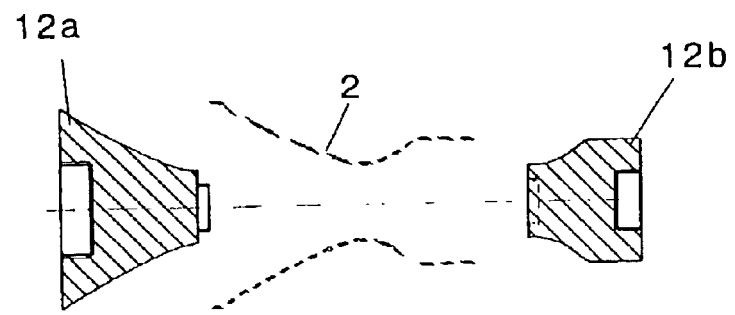

FIGS. 4A to 4D are schematic views of a manufacturing method in which the mandrel of FIG. 3 is used. In the drawing, FIG. 4A is a view of a braiding process to a machining process, FIG. 4B is a view of a dividing process for each product, FIG. 4C is a divided view of the connection segment, and FIG. 4D is a divided view of the mandrel segment.

As shown in FIG. 4A, after forming a fabric 1 on the surface of the integral mandrel 10, the formed fabric 1 is infiltrated with matrix. If necessary, further machining of an outer peripheral surface is performed on the integral mandrel 10 as it is. Thereby, a plurality of products can simultaneously be manufactured on the surface of a plurality of mandrel segments 12.

Additionally, in the method of the present invention, since the same end portions of both end portions 12a, 12b of the mandrel segment 12 are connected to each other, a stepped portion can hardly be formed in the connected portion. Therefore, in the braiding process the fiber can smoothly be wound onto the entire surface of the integral mandrel 10, and the fabric 1 can be formed on the surface of the respective mandrel segments 12.

Moreover, for fiber loss generated in the braiding process for winding onto an engaging allowance to a loom and a portion of the mandrel other than a product portion, even when the integral mandrel 10 is used, an absolute amount is substantially the same as that when unit products are individually manufactured one by one. Therefore, by performing simultaneous braiding for a plurality of products, the fiber loss per unit product can be reduced to a few fractions.

Furthermore, even in the braiding process and subsequent CVI treatment, PIP treatment and machining, simultaneous machining is possible for a plurality of products, labor of setting/preparation or the like to the apparatus is reduced to a few fractions per unit product as compared with a case in which the products are individually treated one by one, and the productivity can be enhanced so much more.

Moreover, as shown in FIG. 4B, thereafter, at a portion of the groove 15 for product separation, for example, a cutter 16 is used to perform cutting and dividing into respective products (ceramic matrix composite members 2). Subsequently, as shown in FIG. 4C, the connected portion of the mandrel segment 12 is separated, so that respective products can be separated.

Furthermore, as shown in FIG. 4D, by dividing the mandrel segment 12 into respective end portions 12a, 12b at the middle portion 12c, the segment is divided into the respective unit products (ceramic matrix composite members 2), and is subsequently subjected to further necessary processes (e.g., PIP treatment and machining), so that the products can be completed.

Moreover, the dividing process of each product of FIG. 4B is preferably performed after the PIP treatment and machining are completed, but the present invention is not limited to this, and the process may be performed after performing the CVI treatment to such an extent that a product shape can be held.

As described above, according to the manufacturing method and apparatus of the present invention, a plurality of products can simultaneously be manufactured, this remarkably reduces the fiber loss, the productivity can be enhanced, and other superior effects are provided. The method and apparatus are effective particularly for a small-sized (outlet diameter of 10 mm or less) chamber or nozzle.

Additionally, the present invention is not limited to the aforementioned embodiment, and can of course be modified variously without departing from the scope of the present invention. For example, in the above description, a thrust chamber or another rotary member as the product has been described in detail, but the present invention is not limited to this, and can also be applied to an arbitrary-shape fuel piping, turbine vane, combustor, afterburner component, and the like.

What is claimed is:

1. A manufacturing apparatus of fiber reinforced composite member for forming a fabric on the surface of a mandrel, and infiltrating the formed fabric with matrix, the mandrel comprising a plurality of mandrel segments, each of which has two end portions and is constituted to be dividable at a middle portion which is smaller than both end portions, and a plurality of connection segments for connecting the plurality of mandrel segments with the same corresponding end portion of each adjacent mandrel segment connected to one another.

2. The manufacturing apparatus of fiber reinforced composite member according to claim 1, wherein a maximum diameter of said connection segment is formed to be smaller than a diameter of a connected portion to the mandrel, wherein each said connection segment comprises two ends, each end having a projection, each projection including a screw portion for connecting with the mandrel segment.

* * * * *